(12) United States Patent
Horie et al.

(10) Patent No.: US 6,284,404 B1
(45) Date of Patent: Sep. 4, 2001

(54) BATTERY AND GAS EFFLUENT SYSTEM THEREFOR

(75) Inventors: Hideaki Horie; Mikio Kawai; Yasuhiko Ohsawa; Takaaki Abe; Toyoaki Nakagawa; Osamu Shimamura; Yuuji Tanjo; Ken Iwai, all of Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/366,957

(22) Filed: Aug. 4, 1999

(30) Foreign Application Priority Data

Aug. 4, 1998 (JP) .................................................. 10-220727

(51) Int. Cl.$^7$ ...................................................... H01M 2/12
(52) U.S. Cl. .............................. 429/59; 429/60; 429/129; 429/246
(58) Field of Search .................................. 429/57, 59, 53, 429/231.95, 129, 136, 246, 247, 60

(56) References Cited

U.S. PATENT DOCUMENTS 5,741,608 * 4/1998 Kojima et al. ........................ 429/94
6,037,071 * 3/2000 Poirier et al. .............................. 429/7

* cited by examiner

*Primary Examiner*—Gabrielle Brouillette
*Assistant Examiner*—Monique Wills
(74) *Attorney, Agent, or Firm*—Foley & Lardner

(57) ABSTRACT

A vehicle (V) includes a battery enclosure (152) enclosing a battery system (B). Each battery ($B_n$) includes a cell (1) that comprises a rolled lamination (LM) of a positive sheet electrode (11) having layers (13) of positive-pole-oriented active substance coated on both side of a charge collecting sheet (12), a negative sheet electrode (21) having layers (23) of negative-pole-oriented active substance coated on both sides of another charge collecting sheet (22), and electrolyte-containing separator (31) between the layers of active substances. The batter further includes a cell enclosure (2) totally enclosing the cell. A gas effluent system (100) for the battery system comprises a gas release system ($RS_n$) for generated gas in the cell of each battery to be released outside the cell enclosure, and a gas discharge system (DS) for released gas to be discharged outside the battery enclosure. The gas release system comprises gas release circuitry including a network (NT) of blanks (Cp: P=1,2, . . . , q, . . . ) formed in the lamination, e.g. pointed or zoned blanks (14, 14A, 15, 16, 17, 18) formed in the layer(s) of active substance(s) and/or the charge collecting electrode(s), a blank space (Sp) between the cell and the cell enclosure, and release valve (4a, 6a). The gas discharge system comprises a gas discharge circuit (DC) communicable with the gas release circuitry, and provided as a draft controllable ducting (150, 170) defined between a floor panel (153) of vehicle body (VB) and a wall of the battery enclosure.

17 Claims, 9 Drawing Sheets

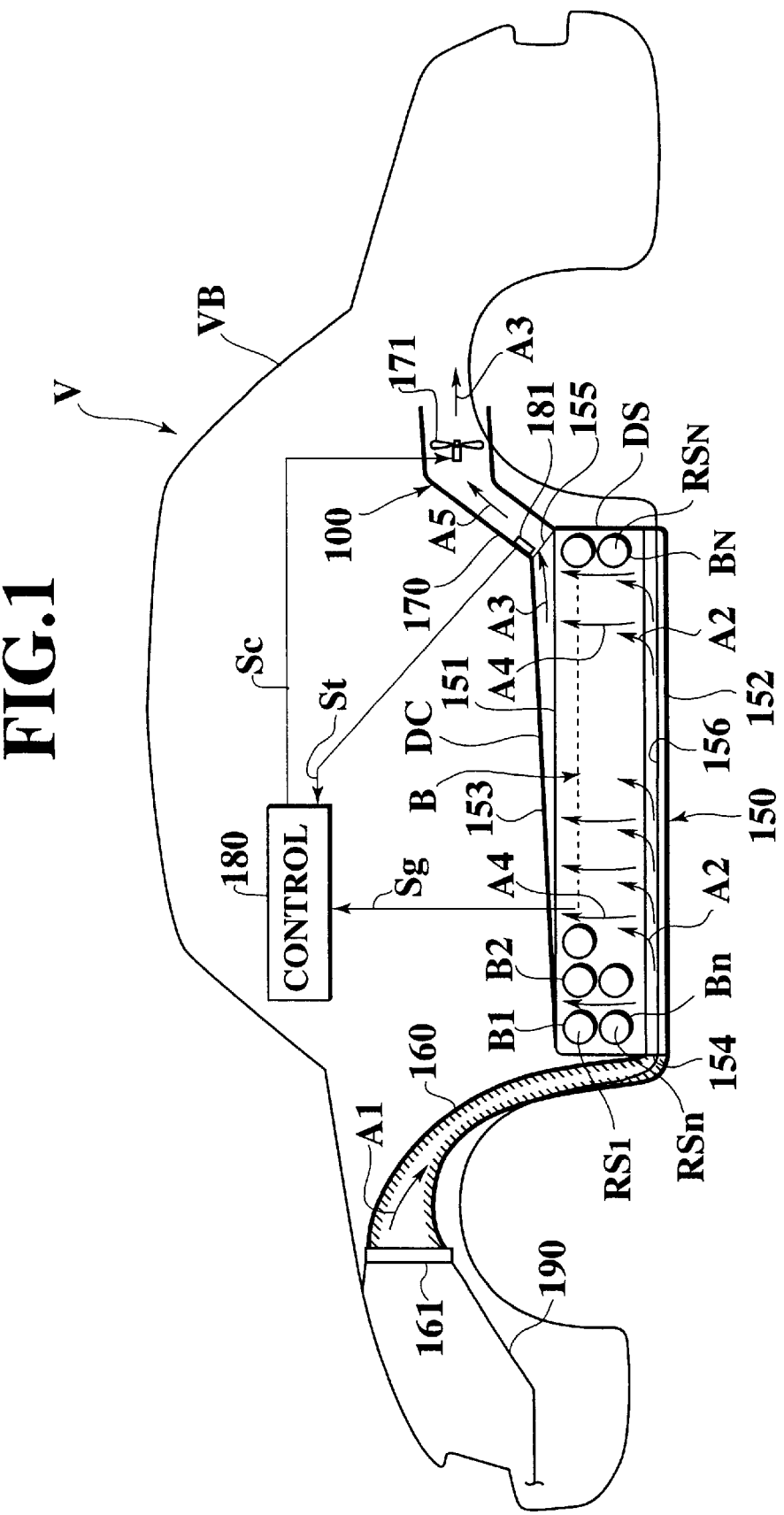

BATTERY AND GAS EFFLUENT SYSTEM THEREFOR

BACKGROUND OF THE INVENTION

The present invention relates generally to a battery and to a gas effluent system therefor, and in particular to a battery, preferably for a vehicle, that has a system allowing for gas generated in the battery to be released outside, and to a gas effluent system for a battery in a vehicle.

A battery in an electric or hybrid vehicle is installed in a battery enclosure, and comprises a cell and a cell enclosure. The cell is comprised of a lamination of a positive sheet electrode, a negative sheet electrode, and a separator between the positive and negative sheet electrodes.

When the battery is operated at higher temperatures than a critical temperature above a normal operating temperature, the cell has a tendency to generate gas therein. Generated gas is released along a gap between the cell and the cell enclosure.

SUMMARY OF THE INVENTION

As the cell has a increased energy density, the gas generating tendency rises, calling for an implementation to effect smooth efflux of generated gas. This invention has been achieved with the point in view.

It therefore is an object of the invention to provide a battery with a system that can effectively release generated gas outside a cell enclosure. It also is an object of the invention to provide a gas effluent system for a battery in a vehicle, that can effect smooth efflux of gas outside a battery enclosure.

To achieve the object, an aspect of the invention provides a battery comprising a cell comprised of lamination of a positive sheet electrode, a negative sheet electrode, and a separator between the positive and negative sheet electrodes, cell enclosure enclosing the cell, and a gas release system for gas generated in the cell to be released outside the cell enclosure, the gas release system comprising a network of blanks formed in the lamination.

Further, to achieve the object, another aspect of the invention provides a gas effluent system for a battery in a vehicle, the battery including a cell comprised of a lamination of a positive sheet electrode, a negative sheet electrode, and a separator between the positive and negative sheet electrodes, and a cell enclosure enclosing the cell, the vehicle having a battery enclosure enclosing the battery, the gas effluent system comprising a gas release system provided inside the battery for generated gas in the cell to be released outside the cell enclosure, the gas release system comprising a network of blanks formed in the lamination, and a gas discharge system for released gas to be discharged outside the battery enclosure.

BRIEF DESCRIPTION OF THE ACCOMPANYING DRAWINGS

The above and further objects and novel features of the invention will more fully appear from the following detailed description when the same is read in conjunction with the accompanying drawings, in which:

FIG. 1 is an illustration of an essential portion of a vehicle including a gas effluent system for batteries installed therein, according to an embodiment of the invention;

FIGS. 2A, 2B and 2C illustrate a common constitution of the batteries of FIG. 1, in which FIG. 2A is an appearance of a representative battery, FIG. 2B, an appearance of a lithium ion cell in the battery of FIG. 2A, and FIG. 2C, a longitudinal section of a lamination in the cell of FIG. 2B;

FIGS. 3A, 3B and 3C illustrate a common structure of the batteries of FIG. 1, in which FIG. 3A is a perspective view of a cell enclosure of the representative battery of FIGS. 2A to 2C, FIG. 3B, a perspective view of the lithium ion cell, and FIG. 3C, a longitudinal section of an essential portion of the representative battery;

Figure 4A:
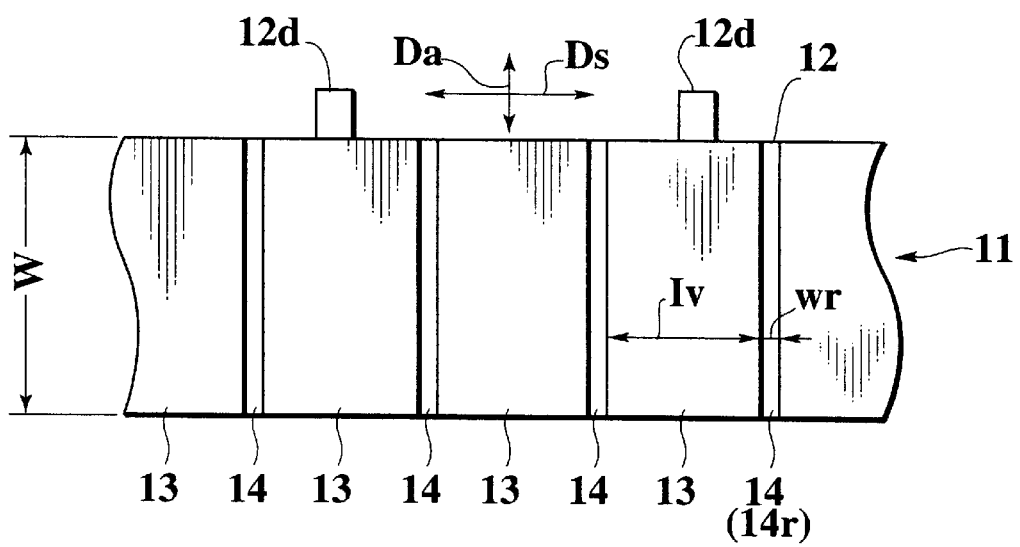
Figure 4B:
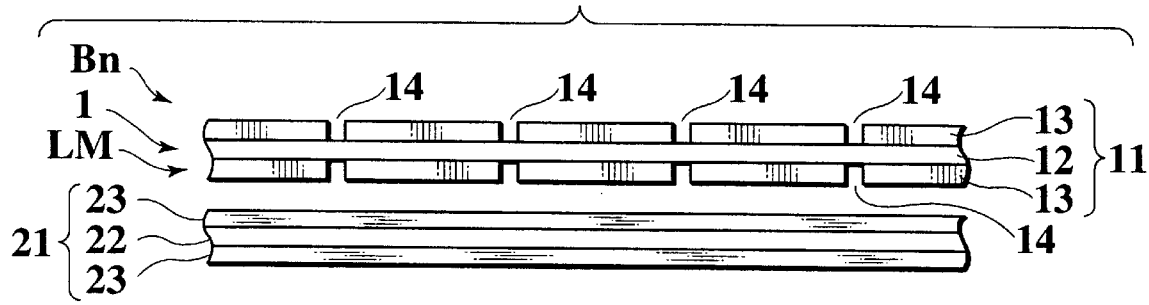
Figure 4C:
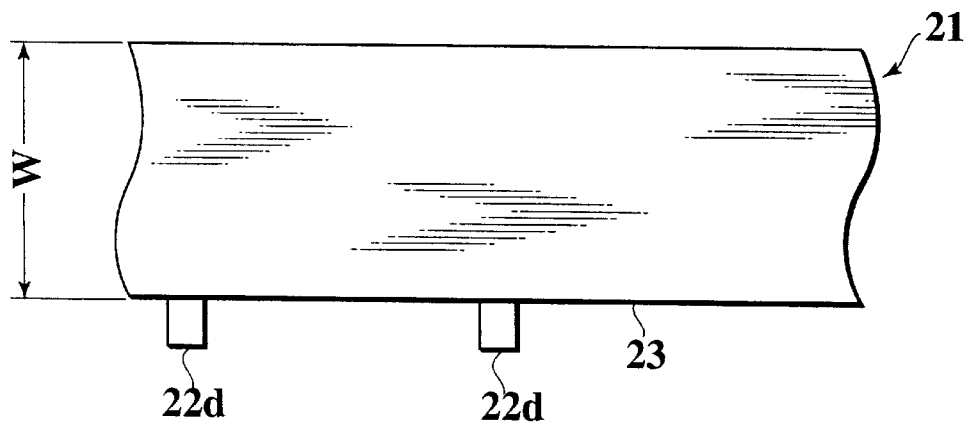
Figure 5:
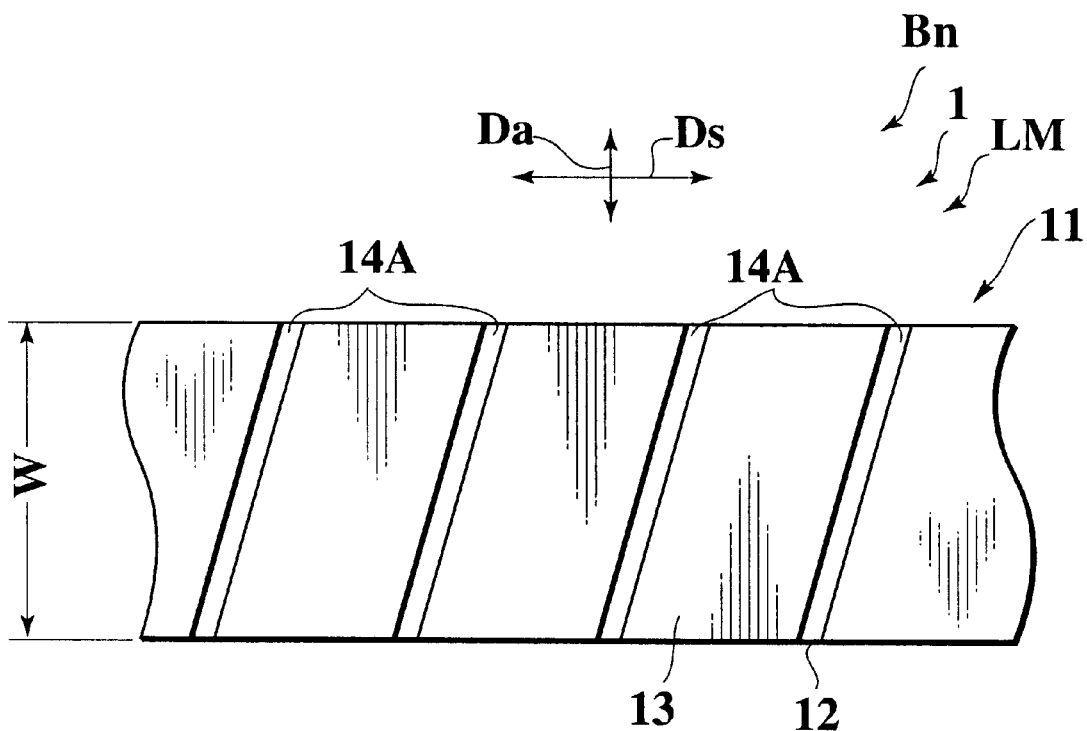
Figure 6A:
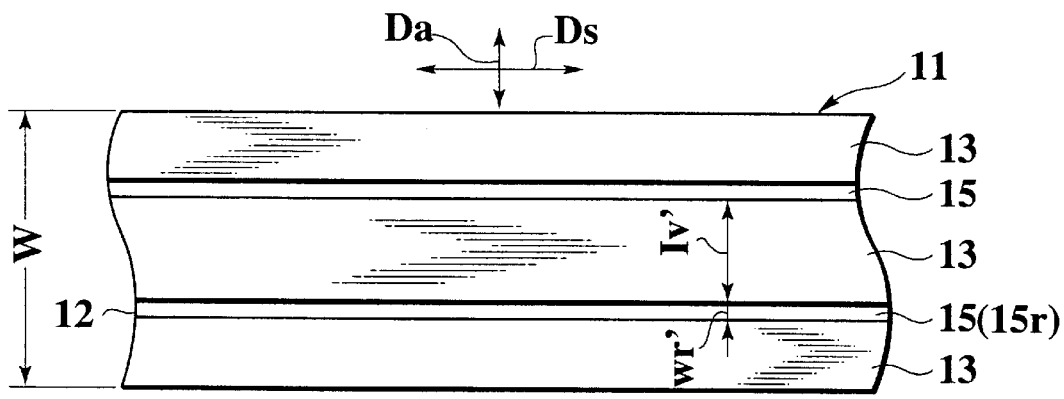
Figure 6B:
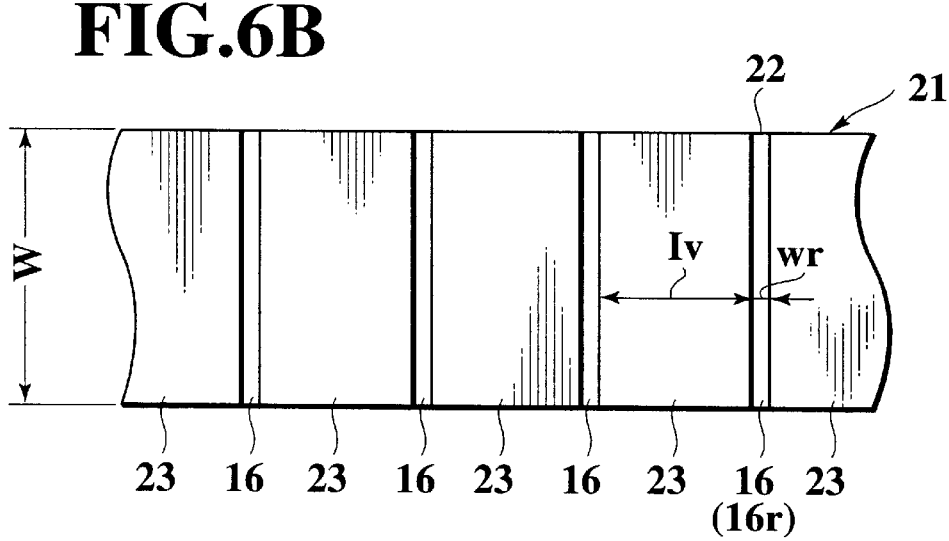
Figure 6C:
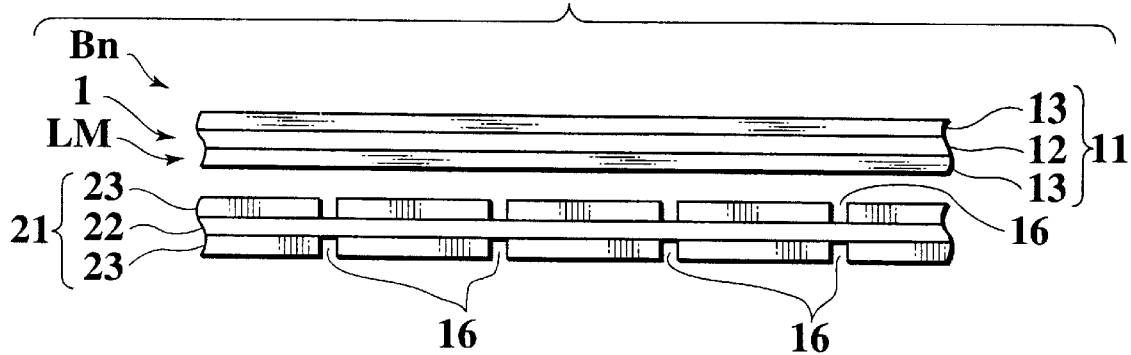
Figure 7A:
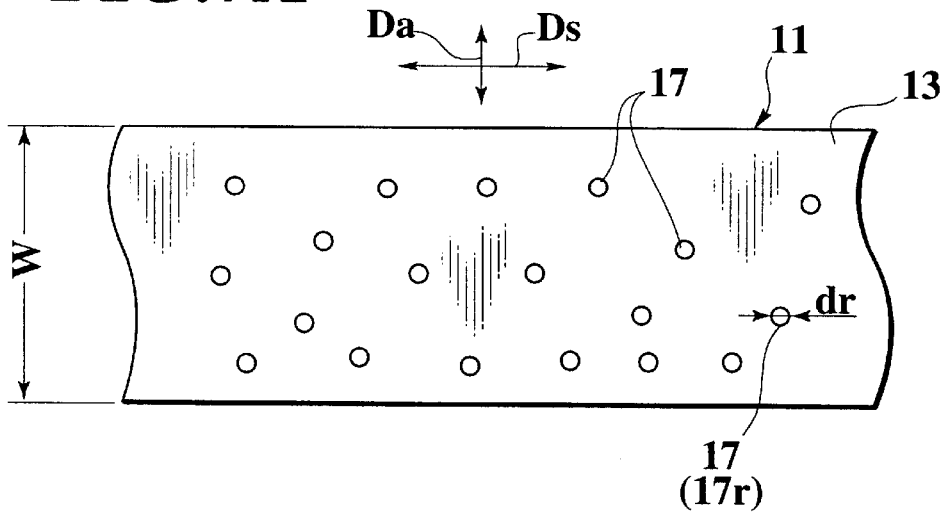
Figure 7B:
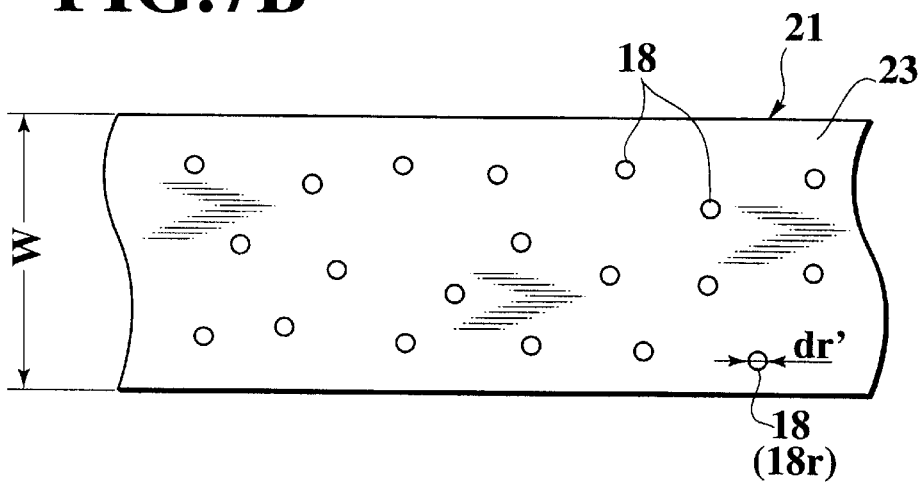
Figure 7C:
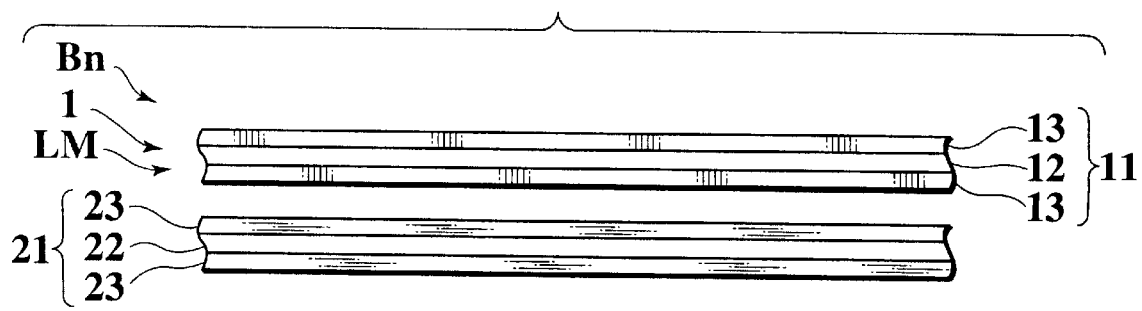
Figure 8A:
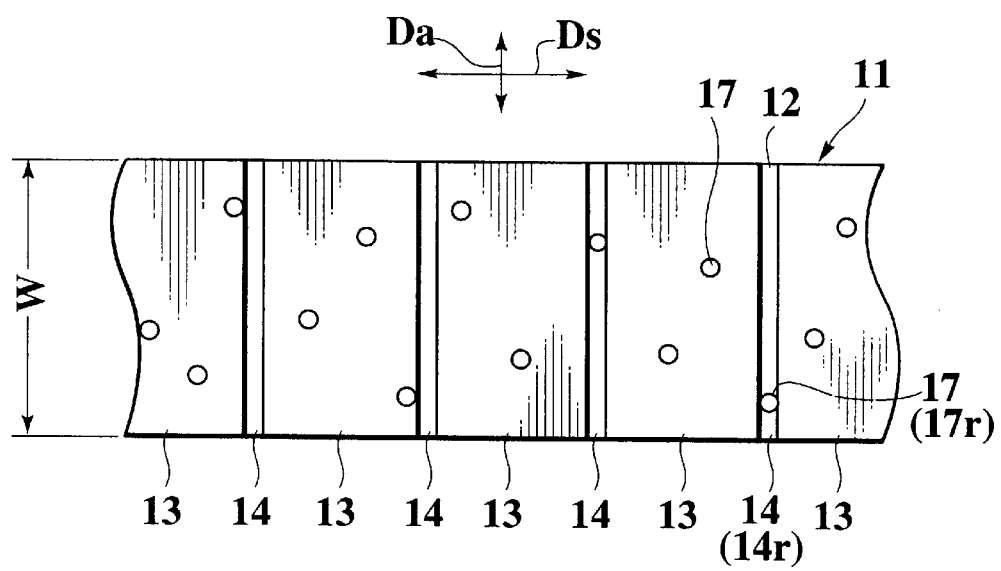
Figure 8B:
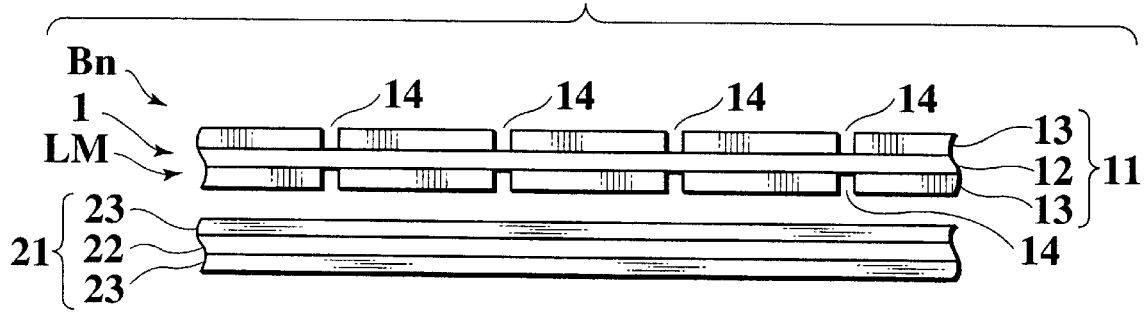
Figure 9A:
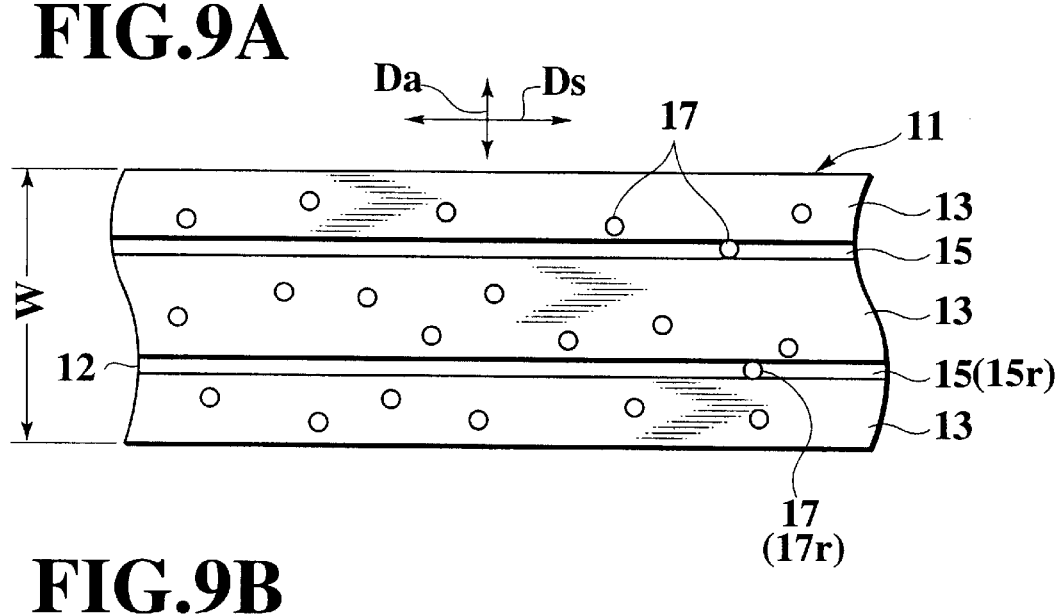
Figure 9B:
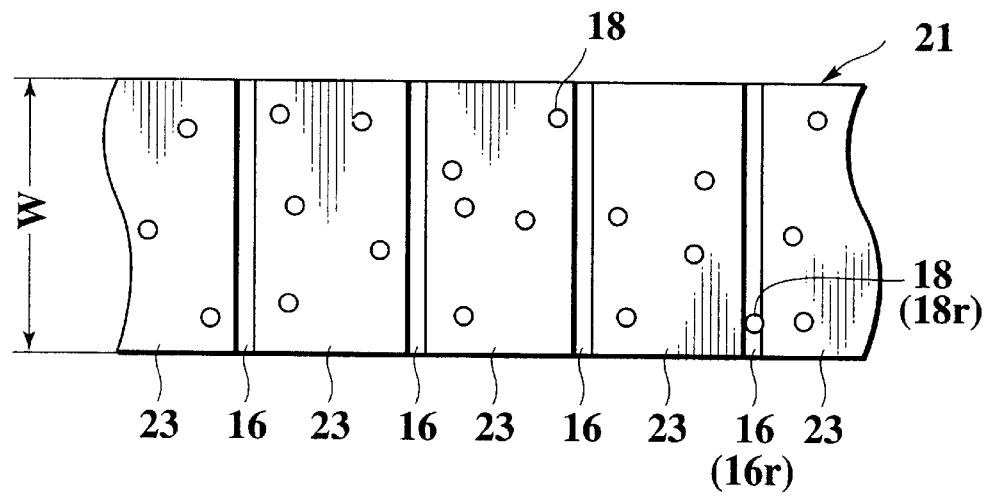
Figure 9C:
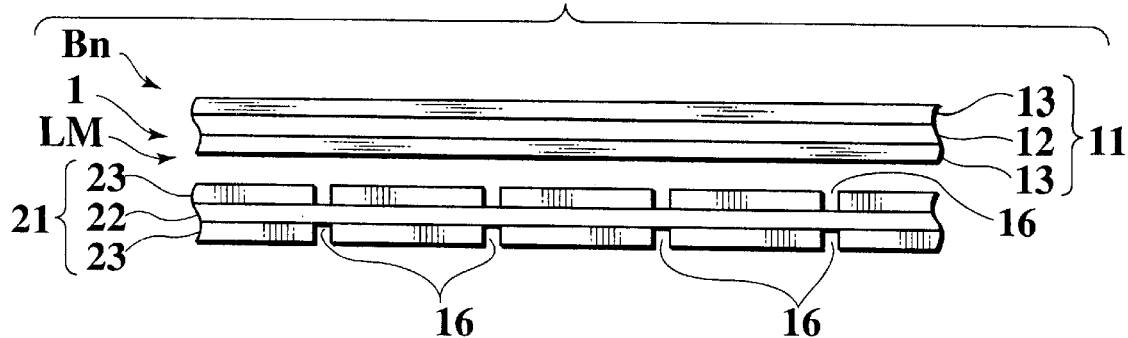

FIGS. 4A, 4B, and 4C illustrate cell components of a battery according to an embodiment of the invention, in which FIG. 4A is a plan of positive sheet electrode in a developed form, FIG. 4B, side views of the positive sheet electrode of FIG. 4A and a negative sheet electrode in a developed form, and FIG. 4C, a plan of the negative sheet electrode of FIG. 4B;

FIG. 5 is a plan of a positive sheet electrode in a developed form, as a cell component of a battery according to an embodiment of the invention;

FIGS. 6A, 6B, and 6C illustrate cell components of a battery according to an embodiment of the invention, in which FIG. 6A is a plan of a positive sheet electrode in a developed form, FIG. 6B, a plan of a negative sheet electrode in a developed form, and FIG. 6C, sides views of the positive and negative sheet electrodes of FIGS. 6A and 6B;

FIGS. 7A, 7B, and 7C illustrate cell components of a battery according to an embodiment of the invention, in which FIG. 7A is a plan of a positive sheet electrode in a developed form, FIG. 7B, a plan of a negative sheet electrode in a developed form, and FIG. 7C, side views of the positive and negative sheet electrodes of FIGS. 7A and 7B;

FIGS. 8A and 8B illustrate cell components of a battery according to an embodiment of the invention, in which FIG. 8A is a plan of a positive sheet electrode in a developed form, and FIG. 8B, side views of the positive sheet electrode of FIG. 8A and a negative sheet electrode in a developed form; and FIGS. 9A, 9B, and 9C illustrate cell components of a battery according to an embodiment of the invention, in which FIG. 9A is a plan of a positive sheet electrode in a developed form, FIG. 9B, a plan of a negative sheet electrode in a developed form, and FIG. 9C, side views of the positive and negative sheet electrodes of FIGS. 9A and 9B.

DETAILED DESCRIPTION OF THE PREFERRED EMBODIMENTS

There will be detailed below the preferred embodiments of the invention with reference to the accompanying drawings. Like members are designated by like reference characters.

FIG. 1 illustrates an essential portion of a four-wheel vehicle V having a battery system B provided with a gas effluent system 100 allowing for generated gas in the battery system B to flow outside a body VB of the vehicle V, according to an embodiment of the invention.

The vehicle V may be an electric vehicle to be propelled with electric power from the battery system B, or a hybrid vehicle to be propelled with power from either or both of a fossil fuel combustion engine and the battery system B.

The battery system B comprises a total of N horizontally installed cylindrical batteries $\{B_i : i=1, 2, \ldots, n, \ldots, N\}$ arranged in a three-dimensional matrix and supported in their positions by a battery-carrying open-rack 151, which is installed in a U-shaped battery enclosure 152, which is fixed along its top edges to and closed by a rearwardly slightly ascending floor panel 153 of the vehicle body VB in an air sealing manner.

The gas effluent system 100 comprises a total of N gas release system {RSi:i=1,2, ..., n, ..., N} each individually incorporated in a corresponding battery Bi, for generated gas in the battery Bi to be released outside the battery Bi, and a gas discharge system DS commonly connected to the N gas release systems {RSi} in the battery enclosure 152, for released gas to be discharged outside the vehicle body VB.

The gas discharge system DS is provided as a gas discharge circuit DC forming part of the battery-cooling draft-controllable air ducting, and comprises a central ducting 150 which is constituted with the battery enclosure 152 and the floor panel 153, a front ducting 160 which is constituted with front lower members of the vehicle body VB and connected at a rear end thereof to a front air inlet 154 of the central ducting 150, a rear ducting 170 which is defined by extensions of the floor panel 153 and the battery enclosure 152 and connected at a front end thereof to a rear air outlet 155 of the central ducting 150 and has a rear end thereof a motor-driven draft control fan 171 to be normally off, and a draft controller 180 which is responsive to either or both of a gas generation detection signal Sg from any battery Bi and a critical air temperature detection signal Sa from an effluent air temperature sensor 181 to output a command signal Sc to a drive circuit of the draft control fan 171. To provide the detection signal Sa, a critical effluent air temperature is calculated or determined in dependence on boiling points of associated substances, e.g. lithium, in the battery Bi.

The front ducting 160 is open at its front end, via an air filter 161, to a compartment 190 in the vehicle V. The air inlet 154 of the central ducting 150 is open at a bottom level of the battery enclosure 152, and the air outlet 155 is open at a top level of the central ducting 150. The rear ducting 170 is open outside at its rear end between rear wheels of the vehicle V. The gas discharge circuit DC comprises the central ducting 150 and the rear ducting 170. Normally, as the vehicle V runs forward, filtered clean air A1 enter via the front ducting 160 into the central ducting 150, where it spreads over a bottom wall 156 of the battery enclosure 152, and distributed air A2 ascends, contacting on and cooling the N batteries {Bi}, and is collected along the floor panel 153, so that collected air A3 flows outside via the rear ducting 170.

If the gas generation detection signal Sg is given from any battery Bi or when the critical air temperature detection signal Sa is given from the temperature sensor 181, then the draft controller 180 outputs the command signal Sc, thereby driving the fan 171, which induces and draws an increased quantity of air into and out of the central ducting 150, so that accelerated air streams A4 quickly carry away released gas from the battery Bi. In response to the detection signal Sg effluent air A5 is forced out with a greater draft than to the detection signal Sa.

the gas discharge system DS may comprise a number of similar gas discharge circuits each common to a corresponding row, column or stage of the matrix of batteries {Bi}.

Figure 2A:
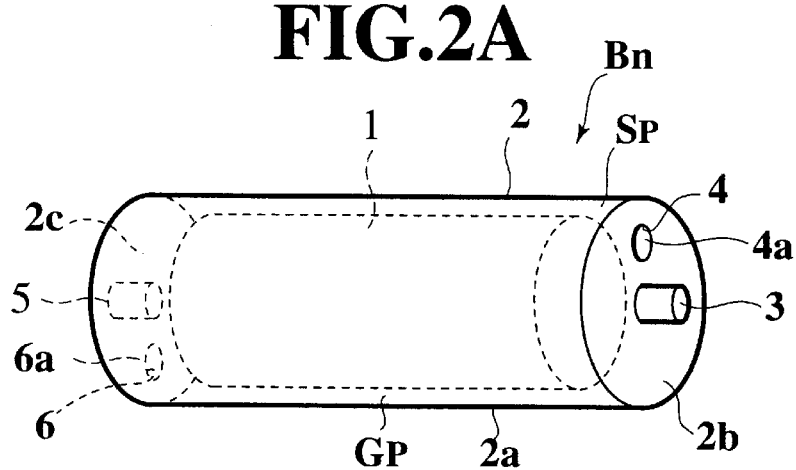
Figure 2B:
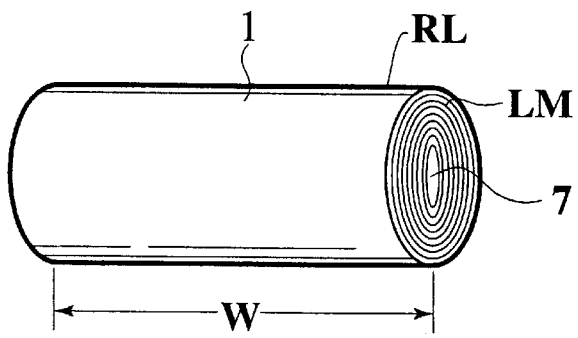

There will be described common constitution and structure of the batteries {Bi} in the battery system B of FIG. 1, with reference to FIGS. 2A to 2C and 3A to 3C. FIG. 2A illustrates the constitution of a representative one Bn(i=n) of the batteries {Bi}; FIG. 2B, a schematic form of a lithium ion secondary cell 1 in the representative battery Bn, as a roll RL of a belt-shaped lamination LM; and FIG. 2C, and exploded structure of the lamination LM. FIG. 3A illustrates the structure of a cell enclosure; FIG. 3B, an entirety of the cell 1; and FIG. 3C, a right end portion of the battery Bn.

As shown in FIGS. 2A and 2B, the battery Bn comprises: the Lithium ion cell 1 as the roll RL of lamination LM wound around a core 7; a cylindrical case 2 as the cell enclosure that totally encloses the cell 1, with a remaining space Sp left therebetween, including a gap Gp between an inside diameter of the case 2 and an outside diameter of the cell 1, as well as clearances along later-described separators; and positive(-pole) and negative(-pole) electrode terminal 3 and 5.

Figure 3A:
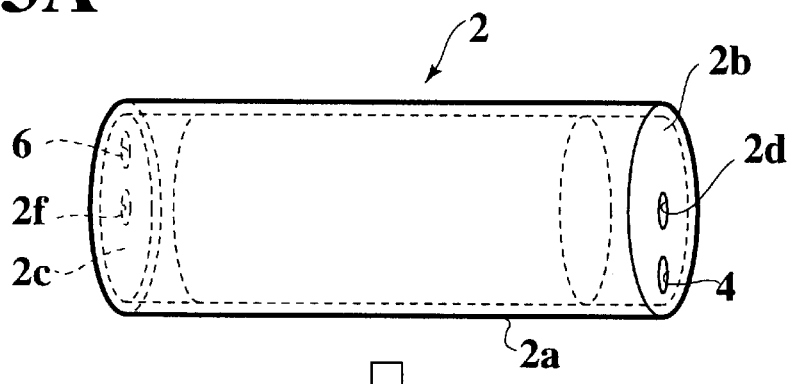
Figure 3B:
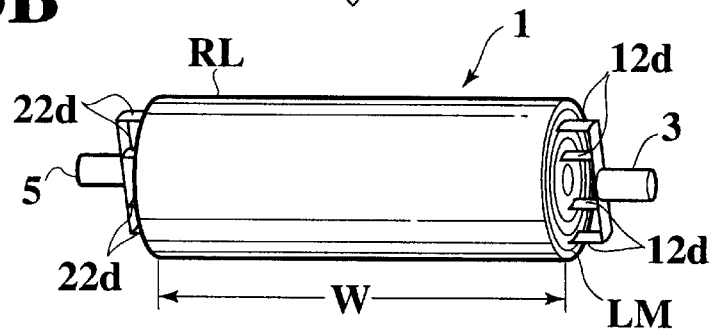
Figure 3C:
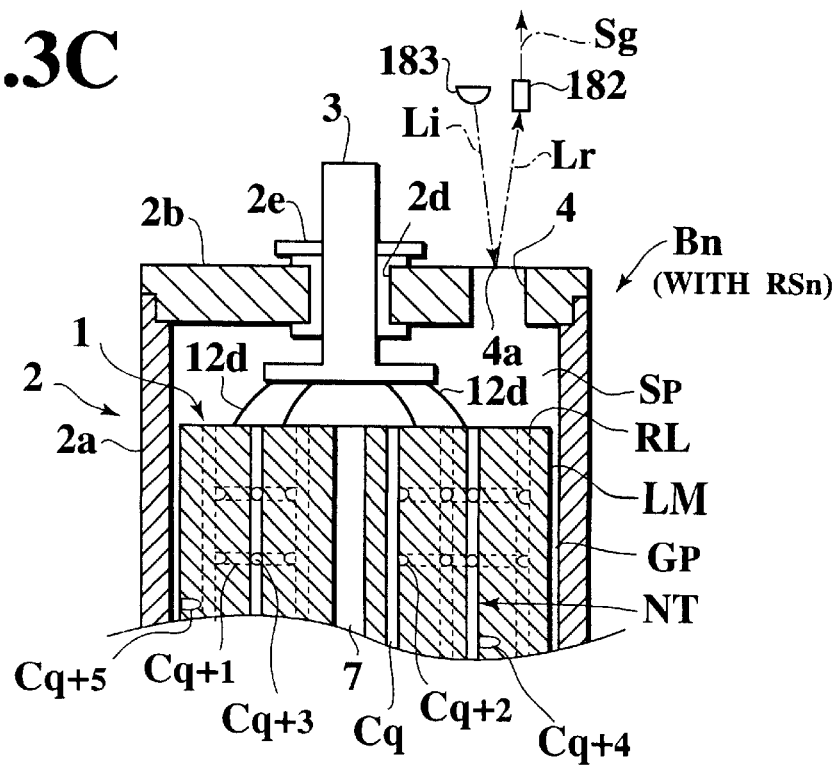

As shown in FIGS. 2A, 3A and 3C, the cylindrical case 2 comprises a cylindrical tubular member 2a and right and left end plates 2b and 2c fitted air-tight thereto. The right end plate 2b is formed with central opening 2d which has a bush 2e fitted therein, and a peripheral gas-release hole 4 which is closed with a release valve 4a. The left end plate 2c also is formed with a central opening 2f which has a bush (not shown) fitted therein, and a peripheral gas-release hole 6 which is closed with another release valve 6a. The release valves 4a and 6a each comprise a metallic foil to be ruptured with a higher gas pressure than a critical pressure in the case 2. Gas generation is detected in terms of a rupture of the foil, which is monitored to provide the detection signal Sg through an optical fiber 182 that observes a reflection Lr of an illumination Li from a common light source 183.

Figure 2C:
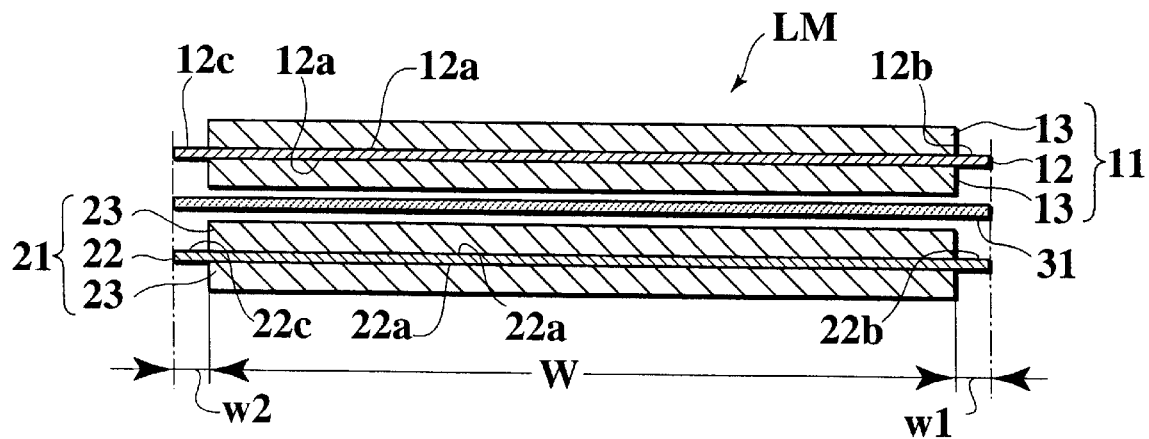

As shown in FIG. 2C, the lamination LM comprises a positive sheet electrode 11, a negative sheet electrode 21, and a sheet separator 31 interposed between the positive and negative sheet electrodes 11 and 21.

The positive electrode 11 comprises: a positive-pole-oriented charge-collecting sheet conductor (hereafter sometimes called "positive collector") 12 as a metallic film, e.g. an aluminum foil, cut in a width (W+w1+w2) that covers at each side of the collector 12 a nominal width W of a designed active region 12a and marginal widths w1 and w2 for right and left edges 12b and 12c; and upper and lower layers 13 of positive-pole-oriented active material or substance, e.g. lithium cobaltate or lithium manganate, evenly coated over the active region 12a on each side of the positive collector 12. As illustrated in FIG. 3B, the positive collector 12 has a necessary number of leads 12d integrally provided on a right edge thereof and spaced at different intervals, to be aligned when the lamination LM is wound. The leads 12d are collected and joined by welding to an extended base end of the positive terminal 3.

The negative electrode 21 comprises: a negative-pole-oriented charge-collecting sheet conductor (hereafter sometimes called "negative collector") 22 as a metallic film, e.g. a copper foil, cut in a width (W+w1+w2) that covers at each side of the collector 22 an identical nominal width W of a designed active region 22a and identical marginal widths w1 and w2 for right and left edges 22b and 22c; and upper and lower layers 23 of negative-pole-oriented active material of substance, e.g. carbon, evenly coated over the active region 22a on each side of the negative collector 22. As illustrated in FIG. 3B, the negative collector 22 has a necessary number of leads 22d integrally provided on a left edge thereof and spaced at different intervals, to be aligned when the lamination LM is wound. The leads 22d are collected and joined by welding to an extended base end of the negative terminal 5.

The separator 31 has an identical width (W+w1+w2), and is uniformly soaked with an electrolytic fluid.

As illustrated in FIG. 3C, the gas release system RSn in the battery Bn is constituted as gas release circuitry comprising the release valves 4 (and 6), the remaining internal space Sp between the cell 1 and the case 2, and a three-dimensional network NT of gas release circuits {$C_p$:p=1,2, ..., q, q+1,q+2,q+3,q+4, ...} formed as blanks (e.g. axial cavity or hollow $C_q$, radial cavity to hollow $C_{q+1}$, spiral cavity or hollow $C_{q+2}$, node or joint hole $C_{q+3}$, internal concave or recess $C_{q+4}$, blind or blocked hole $C_{q+5}$) in the lamination LM and communicating with internal space Sp directly or indirectly. The network NT of gas release circuits {$C_p$} may preferably include a series of congruent or spirally similarly scaled unit patterns of blanks (e.g. those in FIGS. 4A to 9C) spirally extending around the core 7. Note that the blanks are formed (e.g. by a partial removal or displacement or an interruption, failure or void of an element or elements laminated or to be laminated at the sacrifice of a corresponding fraction of a potential cell performance, such as a maximum power output.

The foregoing constitutional and structural characteristics are common to the following embodiments of the invention, unless otherwise described or depicted.

Although the embodiments herein are illustrative in applying the invention to a battery in which positive and negative sheet electrodes and separator therebetween are wound into a roll, it will be understood for artisan that the invention can be applied as well to a battery in which the positive and negative sheet electrodes are merely laminated with a separator therebetween, and further that the invention is not restricted to the substances used in the positive and negative electrodes and in the separator.

There will be described below basic patterns of gas release circuits {$C_p$} in the battery Bn, as preferred embodiments of the invention.

FIGS. 4A, 4B, and 4C illustrate cell components of a battery Bn according to an embodiment of the invention, in which FIG. 4A is a plan of a positive sheet electrode 11 in a developed form, FIG. 4B, side views of the positive sheet electrode 11 and a negative sheet electrode 21 in a developed form, and FIG. 4C, a plan of the negative sheet electrode 21.

In this embodiment, instead of applying a layer 13 of active substance uniformly over both sides of a positive collect 12, "narrow band-shaped zones in which the active substance is not applied" (hereafter sometimes each called "linear blank" or "zoned blank") 14 are provided at a constant pitch or lengthwise scaled proportional intervals Iv. Each linear blank 14 is formed across a width W of the positive electrode 11, in a(two-dimensionally) transverse or (three-dimensionally) axial direction Da that is perpendicular to a (two-dimensionally) longitudinal or (three-dimensionally) spiral direction Ds of a lamination LM in a roll (RL, FIG. 2B) of the battery Bn.

When the positive electrode 11, in which linear blanks 14 have been provided, is wound into a roll together with the negative electrode 21 and a separator (31, FIG. 2C), so as to form the cell 1, the linear blanks 14 provide axial paths (e.g. Cq in FIG. 3C) for gases generated within the cell 1 to be released therethrough, allowing a quick release of gas that may be generated within the cell 1 at a high temperature.

As a designed energy density [Wh/kg or Wh/ht.] becomes greater, the width W of the positive electrode 11 and negative electrode 21 increase. The higher the energy density is the greater is the amount of generated gas. Thus, the wider are the positive electrode 11 and the negative electrode 12, the wider the linear blanks 14 are made. If the linear blanks 14 are made excessively wide, however, there is a corresponding reduction in energy density, with a resultant drop in potential performance of the battery Bn. Accordingly, and optimum or reference width $w_r$ of a reference linear blank 14r (i.e. a linear blank 14 at a reference location in the roll of lamination, e.g. an axial blank Cq in FIG. 3C) is determined by establishing a tradeoff between gas-releasing efficiency and battery performance. In other words, with a sufficient number of blanks 14 provided, an associated gas release system RSn has a maximal gas release rate substantially depending on a dimension $w_r$ of a blank 14r of a network (NT, FIG. 3C) of blanks 14. The cell 1 thus has an output capacity substantially depending on the dimension $w_r$ of the blank 14r.

With regard to reference spacing (Iv) between the reference linear blank 14r and a neighboring linear blank 14 as well, the wider the positive electrode 11 and the negative electrode 12 become and the larger is the energy density, the narrower the spacing (Iv) is made. It should be noted, however, that there is no need to space the linear blanks 14 uniformly.

Although the above embodiment is described for the case in which the linear blanks 14 are provided at the same positions on the front and reverse sides of the positive electrode 11, such a structure can be made with the positions of the linear blanks 14 different on the front and reverse sides.

FIG. 5 illustrate a positive sheet electrode 11 in a developed form, as a cell component of a batter Bn according to an embodiment of the invention.

In this embodiment, linear blanks 14A are formed at an inclination to the spiral direction Ds.

In modifications of the foregoing embodiment, linear blanks 14 and/or 14A may preferably be formed in either or both of positive and negative electrodes 11, 12.

FIGS. 6A, 6B, and 6C illustrate cell components of a battery Bn according to an embodiment of the invention, in which FIG. 6A is a plan of positive sheet electrode 11 in a developed form, FIG. 6B, a plan of a negative sheet electrode 21 in a developed form, and FIG. 6C, sides views of the positive and negative sheet electrodes 11 and 21.

In this embodiment, string-like or tape-like linear blanks 15 are provided with a spacing therebetween on both sides of the positive electrode 11 in a longitudinal or spiral direction Ds. Further, band-shaped linear blanks 16 are provided over a width W on both sides of the negative electrode 21, with a constant or proportional spacing therebetween, in an axial direction Da. A resultant pattern has linear blanks 15 and 16 which are substantially mutually perpendicular. Some or whole longitudinal blanks 15 may extend over length of the positive electrode 11. It should be noted that the longitudinal blanks 15 may be more than two, and have a constant width or scaled widths, as the location moves from a vertical central position toward a top or bottom.

Such linear blanks 15 and 16 may be provided on both positive and negative electrodes 11 and 21 in a crossing manner, to release gas more quickly.

Like the embodiment of FIGS. 4A to 4C, respective optimum widths $w_r$, $w_{r'}$ of and spacing Iv,Iv' respectively between reference linear blanks 15r, 16r and neighboring reference block 15 and 16 are determined to achieve a tradeoff between gas-releasing efficiency and battery performance. In this embodiment as well, it is unnecessary to have uniform width or spacing between linear blanks 15 and 16, and it is further possible to provide linear blanks 15 and 16 on just one side of the positive electrode 11 and negative electrode 21. It also is possible to provide linear blanks 15 and 16 at different positions on the front and rear sides of the positive electrode 11 and/or the negative electrode 21.

FIGS. 7A, 7B, and 7C illustrate cell components of a battery Bn according to an embodiment of the invention, in which FIG. 7A is a plan of a positive sheet electrode 11 in a developed form, FIG. 7B, a plan of a negative sheet electrode 21 in a developed form, and FIG. 7C, side views of the positive and negative sheet electrodes 11 and 21.

In this embodiment, "relative small stopped or through holes of a size or spirally scaled sizes" (hereafter sometimes each called "pointed blank") 17 and 18 are provided in the negative electrode 11 and the positive electrode 21. The larger in reference size (i.e. diameter $d_r$, $d_r$ of reference pointed blanks 17r, 18r as holes 17, 18 at reference locations) these blanks 17 and 18 are, the better will be the gas-releasing performance. Therefore, optimum reference sizes are determined to achieve a tradeoff between gas-releasing performance and battery performance.

A fabrication method of pointed blanks 17 and 18, it is possible to form small holes of reference diameters $d_r$, $d_r$ or scaled diameters in positive and negative collectors 12 and 22 and then to apply active substances 13 and 23 thereon, and also possible to first apply active substances 13 and 23 to the collectors 12 and 22 and then form the blanks 17 and 18. In the former case, although application of the active substances 13 and 23 may block the holes, the pressure of the gas that is generated within the battery at a high temperature will remove blocking fractions of the active substances 13 and 23, thereby opening up paths usable for the release of generated gas.

By providing the pointed blanks 17 and 18 in the positive and negative electrodes 11 and 21 in this manner, when the positive electrode 11 and negative electrode 21 are wound together with a separator (31, FIG. 2C) into a roll to form the cell 1, it is possible to release gas generated within the cell 1 via the blanks 17 and 18.

Although FIGS. 7A to 7C show the example in which pointed blanks 17 and 18 are randomly disposed, these holes can be provided at a uniform spacing, and can further be provided arrayed or arranged in a regular horizontal or vertical patter. In a modification, pointed blanks 17/18 may be provided on only one of the positive and negative electrodes 11 and 21.

FIGS. 8A and 8B illustrate cell components of a battery Bn according to an embodiment of the invention, in which FIG. 8A is a plan of positive sheet electrode 11 in a developed form, and FIG. 8B, side views of the positive sheet electrode 11 and a negative sheet electrode 21 in a developed form.

In this embodiment, both linear blanks 14 and pointed blanks 17 are provided in the positive electrode 11. Configurations and locations of the blanks 14 and 17 may be the same as those in the embodiments described, and it is possible in this structure for some linear blanks 14 and pointed blanks 17 (in particular reference blocks 14r and 17r) to overlap.

When the positive electrode 11, in which both linear and pointed blanks 14 and 17 are provided, is wound together with the negative electrode 21 and a separator (31, FIG. 2C) to form the cell 1, the linear and pointed blanks 14 and 17 form paths for the release of generated gas, thereby enabling a quick release of gas generated within the cell 1 at a high temperature.

FIGS. 9A, 9B, and 9C illustrate cell components of battery Bn according to an embodiment of the invention, in which FIG. 9A is a plan of a positive sheet electrode 11 in a developed form, FIG. 9B, a plan of a negative sheet electrode 21 in a developed form, and FIG. 9C, side views of the positive and negative sheet electrodes 11 and 21.

In this embodiment, the positive electrode 11 is provided with longitudinal linear blanks 15 and pointed blanks 17, and the negative electrode 21 is provided with transverse linear blanks 16 and pointed blanks 18. Configurations and locations the linear blanks 15 and 16 and the pointed blanks 17 and 18 may be the same as those described in associated embodiments.

By winding the positive electrode 11 and the negative electrode 21 in which the linear blanks 15 and 16 and the pointed blanks 17 and 18 are formed, along with a separator (31, FIG. 2C) into a roll form a cell 1, both the linear blanks 15 and 16 and the pointed blanks 17 and 18 serve as paths for the release of generated gases, enabling quick release of gas that is generated within the cell 1 at a high temperature.

In a lithium ion battery, if there is no active substance on a region of a negative electrode that opposes a region of a positive electrode on which an active substance is applied, that region tends to have metal lithium deposited thereon. To avoid such a phenomenon characteristic to lithium ion batteries, linear and/or pointed blanks may preferably be formed in a positive electrode only, so that a negative collector is wholly coated with layers of a negative-pole-oriented active substance on both front and reverse sides thereof.

In the embodiments described, if the temperature of a cell 1 in the BR, exceeds a critical temperature above a normal operating temperature gas may be generated within the cell 1. However, such gas is quickly released via the gas release circuitry comprising a network NT of blanks {Cp} in the lamination LM including linear blanks 14, 14A 15 and/or 16 pointed blanks 17 and/or 18, the remaining space Sp, and the release valves 4a, 6a at both ends of the cell enclosing case 2, as the valves 4a, 6a open or rupture with an increased gas pressure in the Sp, allowing released gas to be discharged outside the vehicle body VB, via the gas discharge system DS.

According to the embodiments described, band-shaped linear blanks provided in a positive electrode and/or a negative electrode serve as release circuits or paths for gas generated within a battery, thereby providing a quick release for this gas to outside the battery.

Specifically, in its basic form applied to a battery that has positive and negative sheet electrodes laminated with a separator therebetween, at least one of the two electrodes has a band-shaped linear blank in which an active substance is not applied.

A variation of the basic form has linear blanks on both the positive and negative electrodes of the battery, these linear blanks being mutually intersecting. In yet another variation of the basic form, the lamination formed by the negative electrode, positive electrode and separator is would into a roll, and the linear blanks extend over an entire width of the electrodes, in a direction that is substantially perpendicular to a direction of the winding thereof. In another variation of the basic form, the battery is a lithium ion battery, and the linear blank is provided on only the positive electrode. In yet another variation of the basic form, a width of linear blank is established to achieve both the desired performance in releasing gas generated within the battery at a high temperature, and the performance as a battery.

In another form, a positive and a negative sheet electrode are laminated with a separator therebetween, wherein an object of the invention is achieved by providing pointed blanks in at least one of the electrodes. A variation on this form is a lithium ion battery in which the pointed blanks are provided in only the positive electrode. In another variation, a size of a pointed blank is established to achieve both the desired performance in releasing gas generated with the battery at a high temperature, and the performance as battery.

In another form with a positive and negative sheet electrode laminated with a separator therebetween, an object of the invention is achieved by providing both linear blanks and pointed blanks in at lease one of the electrodes. A variation on this form is a lithium ion battery ion which the linear blanks and pointed blanks provided on only the positive electrode.

Accordingly, there is achieved a quick or quicker release of gas, a reduced tendency of lithium deposition on a negative electrode, and/or a desirable release of internally generated gas subject to a good battery performance.

The contents of Japanese Patent Application No. 10-220727 are incorporated herein by reference.

While preferred embodiments of the invention have been described using specific terms, such description is for illustrative purposes, and it is to be understood that changes and variation may be made without departing from the spirit or scope of the following claims.

What is claimed is:

1. A battery comprising:
   a cell comprised of a lamination of
      a positive sheet electrode comprising a first charge collecting sheet, and a layer of first active substance coated on the first charge collecting sheet,
      a negative sheet electrode comprising a second charge collecting sheet, and a layer of second active substance coated on the second charge collecting sheet, and
      a separator between the positive and negative sheet electrodes;
   a cell enclosure enclosing the cell; and
   a gas release system for gas generated in the cell to be released outside the cell enclosure, the gas release system comprising a network of blanks formed in the lamination, the network of blanks including a zoned blank comprising a first interrupted region of one of the layer of first active substance and the layer of second active substance.

2. The battery of claim 1, wherein the network of blanks includes another zoned blank comprising a second interrupted region of the other of the layer of first active substance and the layer of second active substance.

3. The battery of claim 2, wherein the first and second interrupted regions are elongate in different directions.

4. The battery of claim 2, wherein the first and second interrupted regions are elongate in an identical direction.

5. The battery of claim 1, wherein the lamination is rolled, and the first interrupted region extends in a rolling direction of the lamination.

6. The battery of 1, wherein the lamination has a defined width, and the first interrupted region traverses the lamination.

7. The battery of claim 1, wherein
   the cell is a lithium ion cell,
   the first interrupted region resides on the first charge collecting sheet, and the layer of second active substance is continuous over the second charge collecting sheet.

8. The battery of claim 1, wherein the network of blanks further includes a pointed blank.

9. The battery of claim 8, wherein the pointed blank comprises a first hole provided through one of the positive and negative sheet electrodes.

10. The battery of claim 8, wherein the network of blanks includes another pointed blank comprising a second hole provided through the other of the positive and negative sheet electrodes.

11. The battery of claim 9, wherein
    the cell is a lithium ion cell, and
    the first hole is provided through the positive sheet electrode.

12. The battery of claim 1, wherein the gas release system further comprises a space remaining between the cell and the cell enclosure and communicating with the network of blanks.

13. The batter of claim 12, wherein the gas release system further comprises a release valve provided through the cell enclosure and operative for communication of the space with outside of the cell enclosure.

14. The battery of claim 12, wherein the gas release system has a maximal gas release rate substantially depending on a dimension of a blank of the network of blanks.

15. The battery of claim 14, wherein the cell has an output capacity substantially depending on the dimension of the blank.

16. A battery comprising:
    a cell comprised of a lamination of
       a positive sheet electrode comprising a first charge collecting sheet, and a layer of first active substance coated on the first charge collecting sheet,
       a negative sheet electrode comprising a second charge collecting sheet, and a layer of second active substance coated on the second charge collecting sheet, and
       a separator between the positive and negative sheet electrodes;
    a cell enclosure enclosing the cell; and
    a gas release system for gas generated in the cell to be released outside the cell enclosure, the gas release system comprising a network of blank means formed in the lamination, the network of blank means including a zoned blank means comprising an interrupted region of one of the layer of first active substance and the layer of second active substance.

17. A gas effluent system for a battery in a vehicle, the battery including a cell comprised of a lamination of a positive sheet electrode comprising a first charge collecting sheet and a layer of first active substance coated on the first charge collecting sheet, and negative sheet electrode comprising a second charge collecting sheet and a layer of second active substance coated on the second charge collecting sheet, and a separator between the positive and negative sheet electrodes, and a cell enclosure enclosing the cell, the vehicle having a battery enclosure enclosing the battery, the gas effluent system comprising:
    a gas release system provided inside the battery for generated gas in the cell to be released outside the cell enclosure, the gas release system comprising a network of blanks formed in the lamination, the network of blanks including a zoned blank comprising a first interrupted region of one of the layer of first active substance and the layer of second active substance; and
    a gas discharge system for released gas to be discharge outside the battery enclosure.

* * * * *